Sept. 17, 1940. J. G. OLIVER 2,215,228
PROCESS AND APPARATUS FOR BENDING GLASS SHEETS
Filed April 21, 1937 5 Sheets-Sheet 2

INVENTOR
JAMES G. OLIVER
BY Bradley & Bee
ATTORNEYS.

Sept. 17, 1940. J. G. OLIVER 2,215,228
PROCESS AND APPARATUS FOR BENDING GLASS SHEETS
Filed April 21, 1937 5 Sheets-Sheet 3
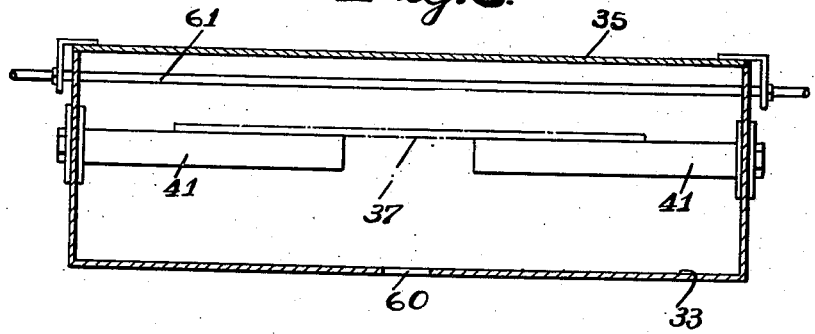
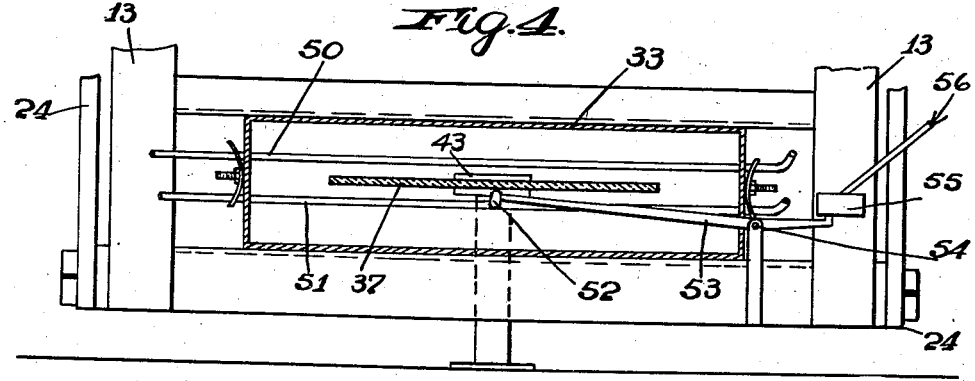
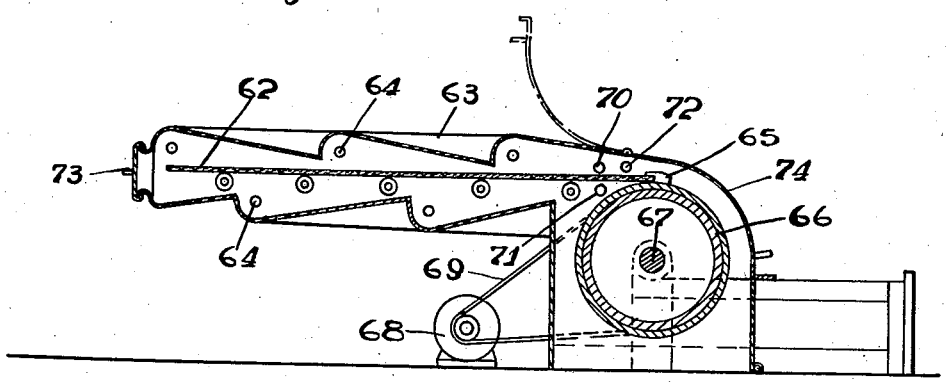
INVENTOR
JAMES G. OLIVER
BY Bradley & Bee
ATTORNEYS.

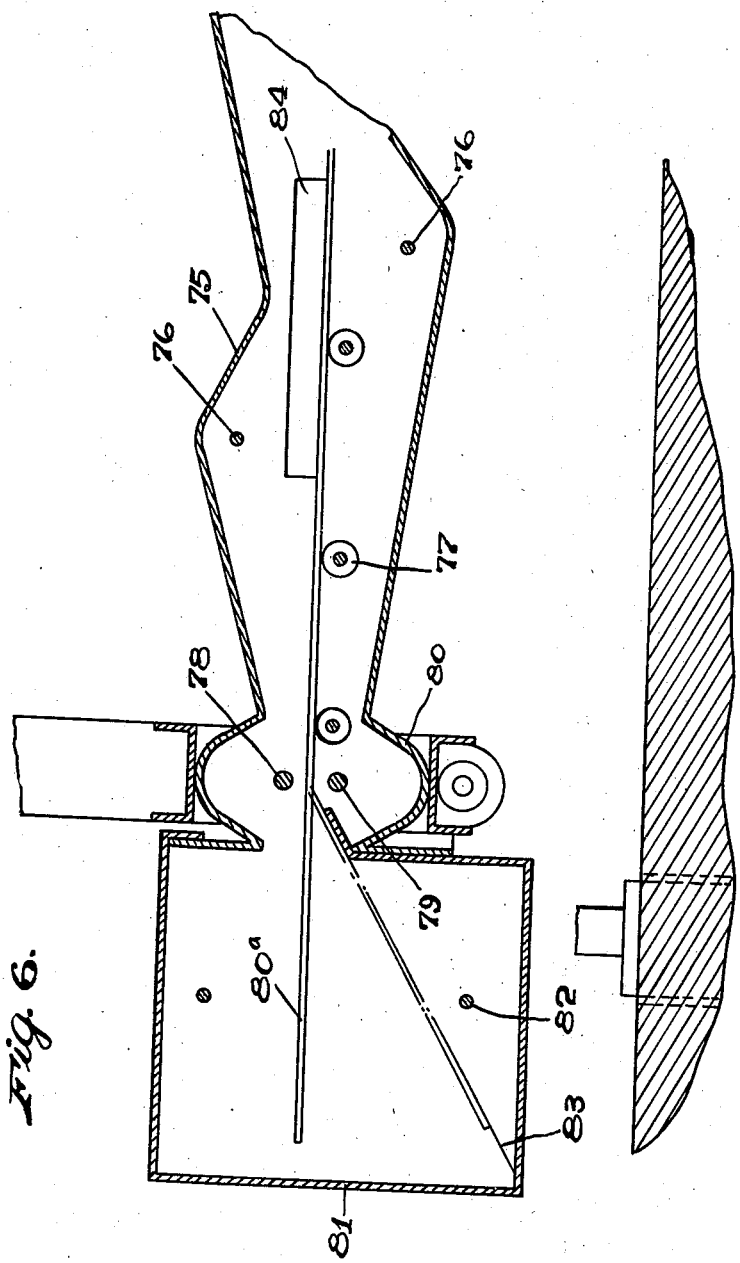

Sept. 17, 1940.   J. G. OLIVER   2,215,228
PROCESS AND APPARATUS FOR BENDING GLASS SHEETS
Filed April 21, 1937   5 Sheets-Sheet 5
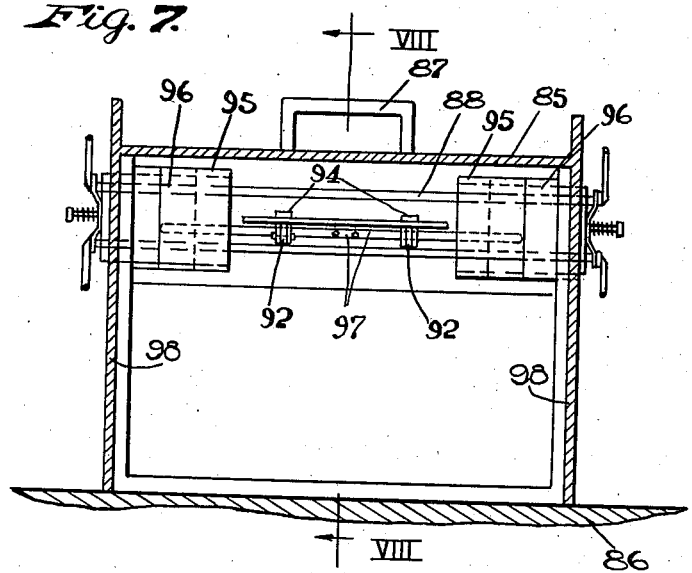
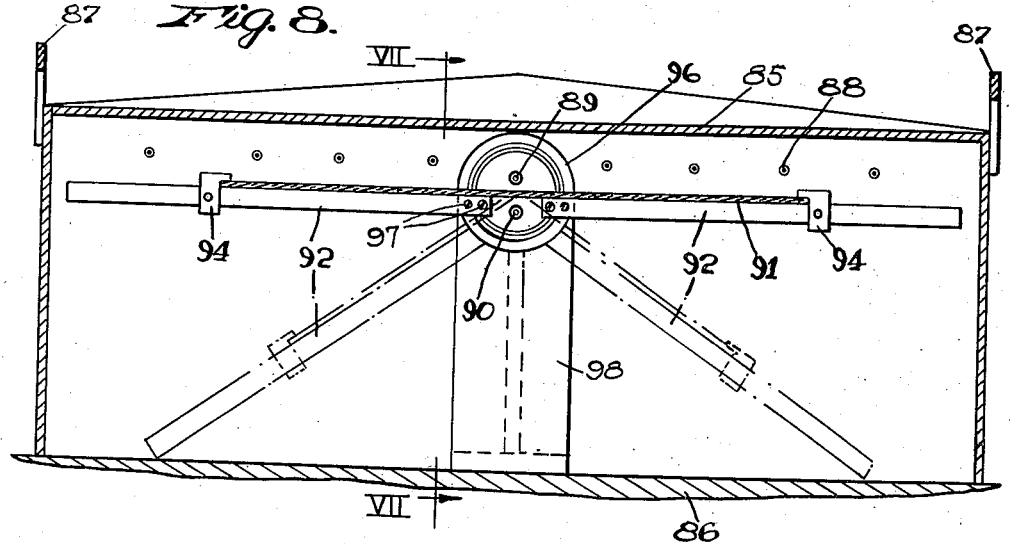
INVENTOR
JAMES G. OLIVER
BY Bradley & Bee
ATTORNEYS.

Patented Sept. 17, 1940

2,215,228

UNITED STATES PATENT OFFICE 2,215,228

PROCESS AND APPARATUS FOR BENDING GLASS SHEETS

James Grey Oliver, Rosslyn Farms, Pa., assignor to Pittsburgh Plate Glass Company, Allegheny County, Pa., a corporation of Pennsylvania Application April 21, 1937, Serial No. 138,197

7 Claims. (Cl. 49—7)

Figure 1:
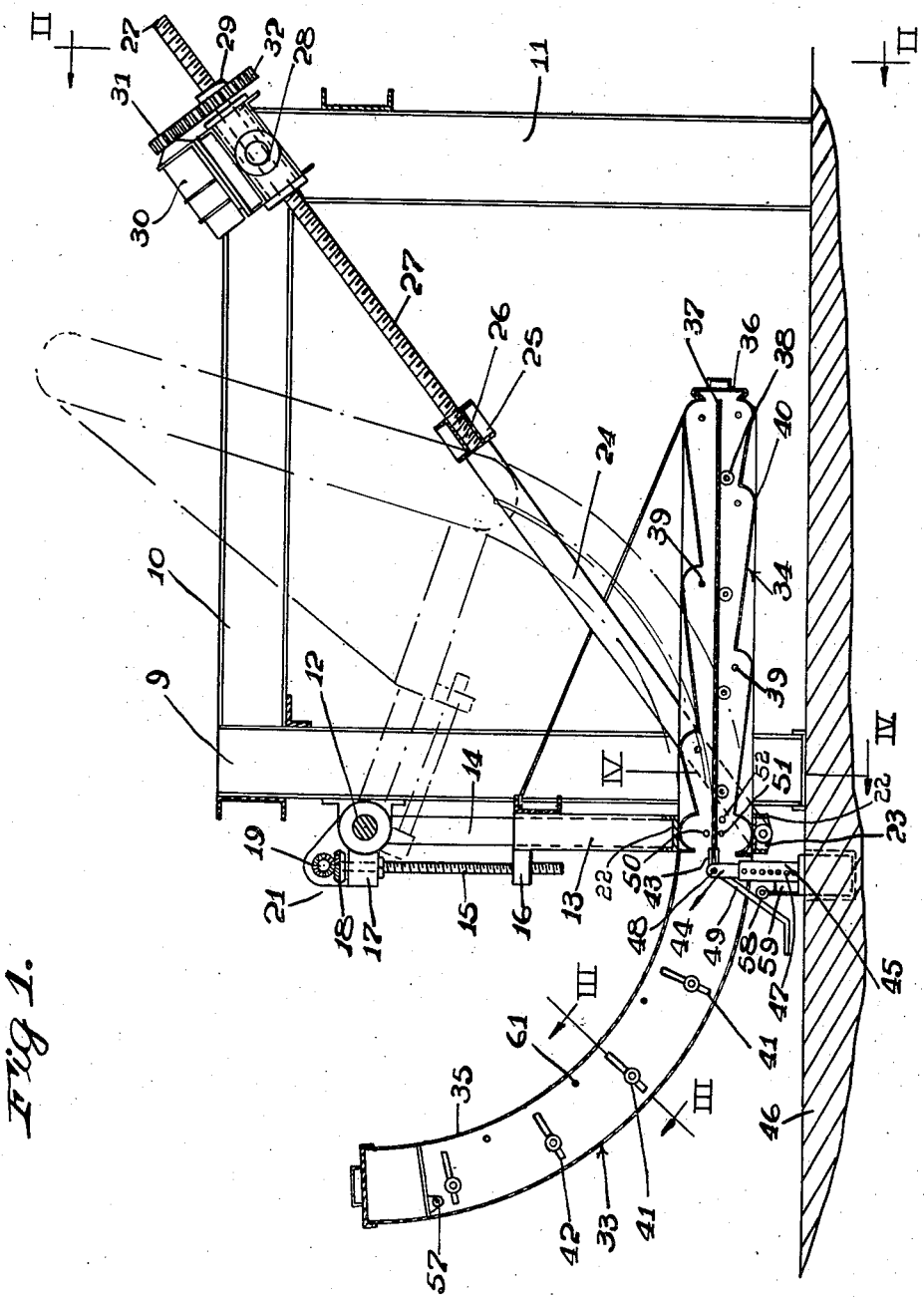
Figure 2:
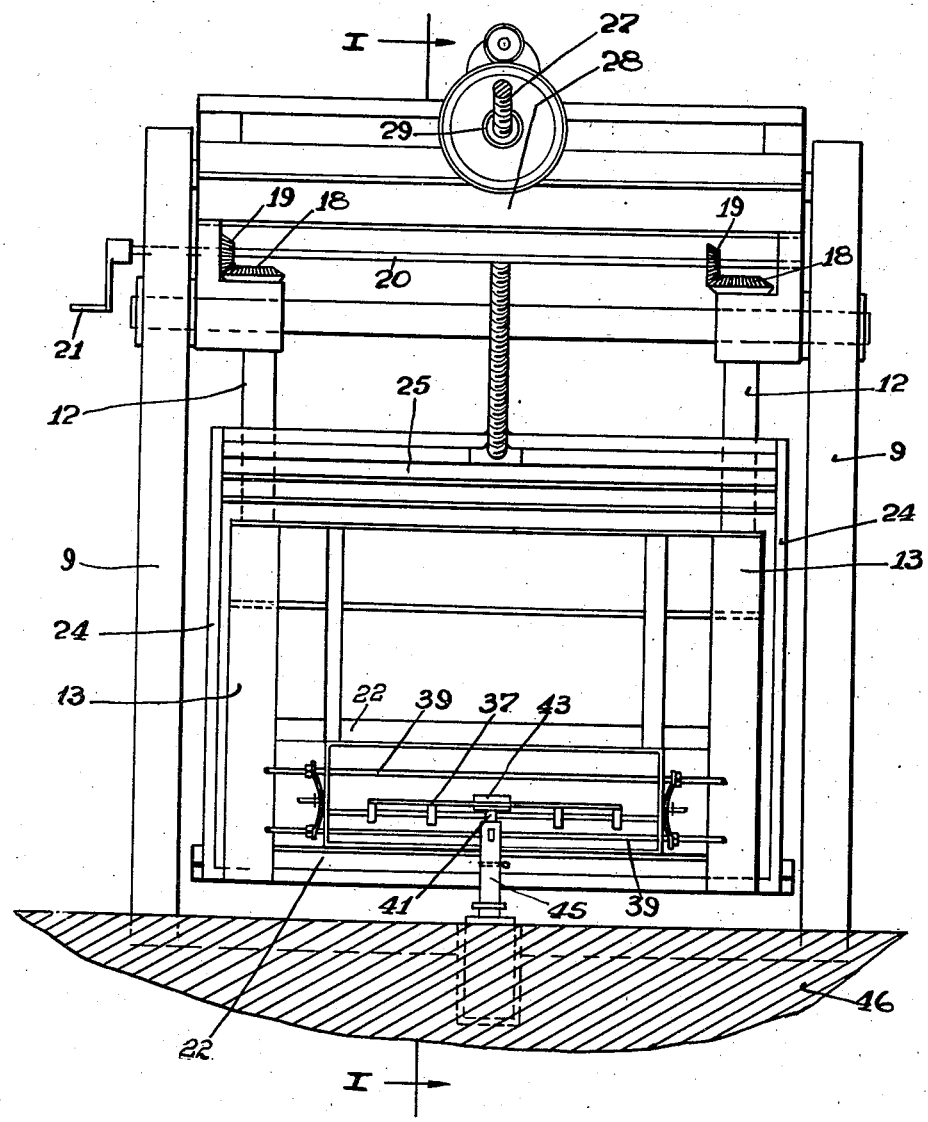

The invention relates to the bending of glass sheets and has for its principal objects the provision of an improved method and apparatus for bending glass sheets singly or in pairs, in case the glass sheets are to be used in the manufacture of bent safety glass requiring a pair of similarly bent sheets for attachment to the usual interlayer of non-shatter material. A further object is the provision of improved means for giving the glass sheets relatively sharp bends without marring the glass. A still further object is the provision of means whereby the glass sheets may be bent progressively and with accuracy without the use of molds or forms and without danger of the marring or the so-called "burning" which sometimes occurs when glass sheets are bent in molds in accordance with common practice. Certain forms of apparatus which may be used in practicing the inventions involved are shown in the accompanying drawings, wherein:

Figure 1 is a section through the apparatus on the line I—I of Fig. 2. Fig. 2 is an end elevation on the line II—II of Fig. 1 with the casing members removed to expose certain of the parts. Figs. 3 and 4 are sections on the lines III—III and IV—IV respectively of Fig. 1. Fig. 5 is a longitudinal section through a modification. Fig. 6 is a section through another modification. And Figs. 7 and 8 illustrate a still further modification wherein, Fig. 7 is a section on the line VII—VII of Fig. 8, and Fig. 8 is a section on the line VIII—VIII of Fig. 7.

Referring to the general arrangement, 9, 10 and 11 are commercial sections which make up the supporting framework of the machine. A transverse shaft 12 is carried upon a pair of brackets secured to the vertical frame members 9, 9 and pivoted upon such shaft is a swinging frame made up of a pair of sleeves 13, 13 and the rods 14, 14 which telescope into the sleeves. The sleeves 13, 13 are adjustable up and down to provide for varying the radius of the bent glass and the adjustment of such arms is accomplished by means of a pair of screws 15, 15 which are threaded through the lugs 16, 16 integral with the sleeves 13, 13. These screws are swivelled at their upper ends in the brackets 17, 17 and are provided with bevel pinions 18, 18 meshing with similar pinions 19, 19 on the transverse rod 20, such rod being provided with a handle 21 for operating the gearing and rotating the screws. The sleeves 13, 13 are secured together by means of a pair of transverse channels 22, 22 and in the lower one of these channels is mounted a pair of blocks 23, to which are pivoted the bars 24, 24 connected at their upper ends by the yoke 25. Mounted in the yoke 25 is a threaded block 26, which is engaged by the screw 27 passing at its upper end through a pivoted block 28. The pivoted block carries at its end a revolving nut 29 through which the screw extends, and such nut is turned from the motor 30 through the intermediary of the gears 31 and 32. The mechanism, as just described, provides for the tilting of the framework to bend the glass, as later described.

Mounted upon the channels 22, 22 is a casing made up of the curved section 33 and the relatively straight section 34. The curved section has a removable cover 35 to permit of the removal of the bent glass after the bending operation, and the casing 35 is provided with a removable end cover 36, to permit of the insertion of the glass sheet 37 preliminary to the bending operation. The casing 34 is provided with a plurality of transverse rollers 38 for supporting the glass sheet and with a plurality of transverse resistance elements or glow bars 39 for heating the glass sheet preliminary to the bending operation. These heating elements are connected with a suitable source of current and are located in curved portions 40 of the casing which act as reflectors to direct the radiant heat from the bars against the glass sheet.

The curved casing 33 is provided with a series of rollers 41 arranged in a curved path and adapted to support the glass sheet during and after the bending operation. These rollers extend transversely of the casing and have their ends mounted in slots 42, so that they may be adjusted transversely of the casing in order to provide for different curvatures of glass. During the operation of the apparatus, the casings are moved from the full line position shown in Fig. 1 to the dotted line position, at which time the bending is complete. After such bending operation is complete, the casing is swung back to its full line starting position, the movement between these two extremes being accomplished by means of the motor and the screw 27 which is connected through the bars 24 to the blocks 23, as heretofore described.

When the glass sheet is placed in the casing 34 preliminary to bending, its left hand end is gripped between a pair of clamping jaws 43 mounted upon the upper end of a vertical adjustable bar 44. This bar is slidably mounted in a standard 45 anchored in the flooring 46, and the bar and standard are provided with a plurality of transverse holes 47 for the reception of a holding pin. By this means the clamp can be adjusted up and down to the proper level, which level will vary depending upon the radius of curvature to be bent and upon the vertical position of the frame, which includes the sleeves 13, 13 adjustable up and down by the screws 15, 15. The lower of the two jaws 43 is fixed against movement on the rod 44, while the upper jaw is pivoted at 48 and is maintained in clamping position by a suitable spring. This upper clamping member has attached to it a pedal 49 so that by depressing the pedal, the clamp may be released to permit of the insertion of the glass sheet or its removal from the clamping device.

Extending transversely of the casing 34 in the forward end thereof is a pair of resistance rods or glow bars 50 and 51, which perform the function of supplying the necessary heat for bending the glass sheet progressively beginning at the left hand end thereof and extending to the right hand end. When the glass sheet is positioned, as indicated in Fig. 1, and the layer of glass between the rods 50 and 51 becomes heated to the softening point, such layer sags and in sagging operates a switch which moves the casings 33 and 34 and the rods 50 and 51 to the right. The switch mechanism includes a roll 52 (Fig. 4) mounted upon a lever 53 which is pivoted to the casing at 54 and has its end in position to operate the button of a micro switch 55. This micro switch controls the flow of current through the connections 56 to the motor 30 and is of the type shown in Patent No. 1,960,020. This switch is designed to operate with a snap action when the button or plunger is allowed to return, the movement of the plunger in making this movement being .001 of an inch. It follows that the switch is operated to start the motor on a very slight amount of sagging of the glass sheet. The motor starts when the switch is closed and moves the casing 34 with the rods 50 and 51 and the roll 52 a slight distance to the right, thus disengaging the roll 52 from the glass. When this disengagement occurs, the switch 55 closes and the motor stops. The apparatus therefor pauses in this position until another bending movement occurs in the glass sheet at a point slightly to the right of the first bending movement. When this occurs, the cycle as above described is repeated. This operation of producing slight bends progressively and moving the casings 33 and 34 to the right is continued until the casings arrive at the dotted line positions shown in Fig. 1. During this movement, the glass sheet is curved and rides upon the series of rolls 41 in the casing 33. The successive heating operations and movements of the casings and heating rods 50 and 51 are so closely spaced and so slight that the curvature in the sheet while made up of a series of slight bends which merge together are of such character that the finished sheet exhibits no departure from a uniform curvature.

When the casings 33 and 34 arrive at the dotted line position, thus completing the bending operation, a trip roller 57 (Fig. 1) at the end of the casing 33 engages the operating pedal 49 swinging it to the right and releasing the clamp 43. At the same time, the pedal engages the arm 58 of a limit switch 59 which cuts off the supply of current to the motor 30. To repeat the operation, the casings 33 and 34 carrying the glass sheet, are returned to the starting position by means of the screw 27 operated from the motor 30, and after the parts arrive in the full line position shown, the bent sheet is removed from the casing 33 by removing the cover 35. A new sheet is now placed in the casing 34 by removing the cover 36, such sheet being clamped at its forward end in the device 43, as heretofore described. The clamp 43 and standard 45 are located midway between the side walls of the casing 33, and since such casing must pass these parts in its movement to the right, the casing is slotted, as indicated at 60 (Fig. 3) to permit of this relative movement.

If a bending operation is required in which the radius of curvature of the sheet must be decreased, this is accomplished by adjusting the sleeves 13, 13 upward on the arms 14, 14, so as to lessen the radius of curvature, and by correspondingly raising the bar 44 which carries the clamp 43 for holding the end of the sheet. Slight adjustments of the rolls 41 for supporting the sheet in the casing 33 are also required. In order to maintain the sheet against too rapid cooling as it moves through the curved casing 33, such casing is provided with a series of transverse heating rods or glow bars 61. If desired, two sheets of glass may be bent at the same time by placing them one upon the other in the casing 34 and proceeding as heretofore described, this being a desirable method of bending in case the two sheets are to be used in the making of bent laminated glass.

The construction shown is designed to bend only circular sections, as the radius of curvature is constant, but by the use of suitable mechanical expedients, such radius might be varied during the bending cycle to produce other curvatures. It is also possible, if the motor is arranged to drive the frame at a constant angular velocity, to substitute a speed regulating means for the micro-switch. Then with glass of practically uniform quality and thickness, the motor speed could be adjusted and made continuous. That is, the motor would not stop, but merely vary its speed slightly within a narrow range, in conformance with the speed regulator operated by the arm now shown as operating the micro-switch.

Fig. 5 illustrates a modification of the apparatus which also produces a progressively bent glass. In this construction, the glass sheet 62 is supported in a casing 63 provided with heating rods 64, as heretofore described in connection with the casing 34. The end of the sheet in this case, is secured to a clamp 65 carried at the periphery of the hollow roll 66, such roll being mounted upon an axle 67 and driven from a motor 68 through the intermediary of suitable reduction gearing, including the belt 69. If desired, the surface of the cylinder may be covered with a layer of asbestos or other suitable yielding refractory material. The glass sheet is progressively heated by passing it between the pair of resistance rods or glow bars 70 and 71 and the heating effect upon the upper side of the sheet is preferably augmented by another resistance bar 72 so that the temperature of the glass is maintained as it passes onto the cylinder and is bent. To produce sheets of different curvatures, cylinders having varying diameters must be used. If desired, a complete glass cylinder may be produced. Removable covers are provided at 73 and 74 for the insertion of the glass sheet and for its removal from the casing.

Fig. 6 illustrates a further modification of the invention designed for producing sharp bends in glass sheets rather than to progressively bend the sheets as heretofore described. In this construction, 75 is the casing which is provided with resistance bars 76, 76, the construction of this casing being similar to that of the casing 34. The glass sheet rests upon rolls 77 and the desired bend is secured by the application of heat in a narrow band opposite the resistance elements 78 and 79 located in the end section 80, which, as in all types of construction, is made of reflector form so as to increase the heating effect of the elements 78 and 79. The forward end of the glass sheet 80a lies in a casing 81 heated by resistance bars 82 and provided with stop means 83 for limiting the movement of the glass sheet when the desired angle of bend, as indicated by the dotted lines, has been secured. In order to maintain the right hand portion of the sheet securely upon the rolls 77, a weight 84 may be placed upon this portion of the sheet. As in the other types of construction, two glass sheets may be bent at the same time, which is desirable procedure when the two sheets are to form parts of a laminated plate. In this, as in all of the structures, it is necessary to bring the temperature of the sheet as a whole up to about 800 or 900 degrees F. before sufficient heat is applied at the point of bending to soften the glass, as otherwise the shock incident to extreme localized heating will cause a fracture of the sheet.

Figs. 7 and 8 illustrate a further modification of the apparatus of Fig. 6 designed to produce sharp bends in glass sheets. In this apparatus the heating is carried out in a rectangular casing 85 which is seated upon the floor 86 and is provided with handles 87 whereby it may be lifted from the bending apparatus after the operation is complete. The cover of the casing or hood is provided with a series of transverse heating rods or glow bars 88 connected to a suitable source of current and adapted to bring the temperature of the glass in the casing up to a point below the softening point preliminary to the bending operation. The glass is supported in the casing with the line of the desired bend in opposition to the pair of resistance elements 89 and 90. The glass sheet 91 is supported upon two pairs of bars 92, 92 which are pivoted together at their inner ends and are provided with clips 94. The glass plate is mounted upon the bars with its end edges beneath the clips, and when the area of glass between the bars 89 and 90 arrives at the softening point, the bars with the glass sheet thereon move down to the position shown in dotted lines in Fig. 8, the engagement of the ends of the bars with the floor limiting the movement thereof. The bars 92 have a pivotal connection at their inner ends incident to their attachment to a pair of relatively rotatable pipe sections 95, 96 by means of transverse bars 97 which are welded thereto and to the bars 92. In this case the weight of the bars assists in bending the glass sheet, so that it will bend at a lower temperature than is the case in an arrangement such as that of Fig. 6, in which the weight of the sheet alone accomplishes the bending function.

What I claim is:

1. A method of bending a glass sheet, which consists in supporting a sheet of glass by means of supporting surfaces spaced along the sheet whereby to provide a narrow unsupported band of glass between such surfaces capable of bending by gravity, heating the sheet throughout to a temperature below its bending temperature and applying radiant heat to each face of the sheet along said narrow band only extending across the width thereof to heat such band to its bending temperature whereby the sheet will bend by gravity along said band, such band being free from contact with any forming body during the bending movement.

2. A method of bending a glass sheet, which consists in supporting a sheet of glass by means of supporting surfaces spaced along the sheet whereby to provide a narrow unsupported band of glass between such surfaces capable of bending by gravity, heating the sheet throughout to a temperature below its bending temperature, applying radiant heat to each face of the sheet along said narrow band only extending across the width thereof to heat such band to its bending temperature whereby the sheet will bend by gravity along said band, and progressively causing a shift longitudinally of the sheet of the application of the radiant heat so that the sheet is progressively heated and bent in a series of bends merging into each other, said band being free from contact with any forming body during the bending movement.

3. A method of bending a glass sheet, which consists in supporting a sheet of glass by means of supporting surfaces spaced along the sheet whereby to provide a narrow unsupported band of glass between such surfaces capable of bending, heating the sheet throughout to a temperature below its bending temperature, applying radiant heat to each face of the sheet along said narrow band only extending across the width thereof to heat such band to bending temperature, progressively shifting the sheet and thereby progressively subjecting successive narrow bands thereof to the radiant heat so that the sheet is progressively heated to bending temperature, and causing an application of force to the sheet coincident with each heating operation so that the sheet is progressively bent into a series of bends merging into each other, said band being free from contact with any forming body during the bending movement.

4. Apparatus for bending glass sheets, comprising a pair of narrow parallel resistance elements, fixedly spaced one above the other, means for supporting a glass sheet to be bent between the elements out of contact therewith, means for heating the sheet throughout to a temperature below the bending temperature, and means for supplying electric current through the resistance elements whereby the glass lying between the elements along a narrow band is heated to the bending point, the support for the glass being arranged so that bending may occur at said band, and the band being free from contact with any forming body during the bending movement.

5. Apparatus for bending glass sheets, comprising a pair of narrow parallel resistance elements, fixedly spaced one above the other, means for supporting a glass sheet to be bent between the elements out of contact therewith, in such manner that gravity applies a bending force to the sheet along the portion thereof between the elements, means for heating the sheet throughout to a temperature below the bending temperature, and means for supplying electric current through the resistance elements whereby the glass lying between the elements along a narrow band is heated to the bending point, said band being free from contact with any forming body during the bending movement.

6. Apparatus for bending glass sheets, comprising a pair of narrow parallel resistance elements, fixedly spaced one above the other, means for supporting a glass sheet to be bent between the elements out of contact therewith in such manner that gravity applies a bending force to the sheet along the portion thereof between the elements, means for heating the sheet throughout to a temperature below the bending temperature, means for supplying electric current through the heating elements whereby the glass lying between the elements along a narrow band is heated to the bending point, and means for feeding the sheet progressively between the resistance elements so that a series of successive bends are produced which merge into each other forming a continuous bend.

7. Apparatus for bending glass sheets, comprising a pair of narrow parallel resistance elements, fixedly spaced one above the other, means for supporting a glass sheet to be bent between the elements out of contact therewith, means for heating the sheet throughout to a temperature below the bending temperature, means for supplying electric current through the heating elements whereby the glass lying between the elements along a narrow band extending across the sheet is heated to the bending point, and means for causing a progressive shifting movement between the resistance elements and sheet longitudinally thereof, and a bending of the glass at the heated bands so that a series of successive bends are produced which merge into each other forming a continuous bend.

JAMES GREY OLIVER.